United States Patent
Cho et al.

(10) Patent No.: US 9,983,600 B2
(45) Date of Patent: May 29, 2018

(54) METHOD OF CORRECTING CONTROL LOGIC OF SELECTIVE CATALYTIC REDUCTION CATALYST AND EXHAUST SYSTEM USING THE SAME

(71) Applicants: Hyundai Motor Company, Seoul (KR); FEV GMBH, Aachen (DE)

(72) Inventors: Ji Ho Cho, Yongin-si (KR); Jin Ha Lee, Seoul (KR); Bastian Holderbaum, Aachen (DE); Bernhard Lüers, Aachen (DE); Alexander Vovk, Aachen (DE)

(73) Assignees: Hyundai Motor Company, Seoul (KR); FEV GMBH, Aachen (DE)

(*) Notice: Subject to any disclaimer, the term of this patent is extended or adjusted under 35 U.S.C. 154(b) by 434 days.

(21) Appl. No.: 14/472,129

(22) Filed: Aug. 28, 2014

(65) Prior Publication Data
US 2015/0177746 A1    Jun. 25, 2015

(30) Foreign Application Priority Data
Dec. 23, 2013  (KR) .......................... 10-2013-0161444

(51) Int. Cl.
   *G05D 21/02*  (2006.01)
   *G05B 15/02*  (2006.01)
   *F01N 3/20*   (2006.01)

(52) U.S. Cl.
   CPC ............. *G05D 21/02* (2013.01); *F01N 3/208* (2013.01); *G05B 15/02* (2013.01);
   (Continued)

(58) Field of Classification Search
   CPC ............... F01N 3/208; F01N 2560/026; F01N 2560/07; F01N 2900/1402;
   (Continued)

(56) References Cited

U.S. PATENT DOCUMENTS 5,201,802 A * 4/1993 Hirota ................... F01N 3/2006
                                              60/276
8,117,829 B2   2/2012 Morita et al.
(Continued)

FOREIGN PATENT DOCUMENTS

CN       101892892 A     11/2010

OTHER PUBLICATIONS

Zhang et al.; *Attitude Control for Satellite with Flexible Appendages by Using Modified Fuzzy Controller*; Aerospace Shanghai; 2004; pp. 42-45; China Academic Journal Electronic Publishing House; China. Abstract only.

*Primary Examiner* — Shogo Sasaki
(74) *Attorney, Agent, or Firm* — Morgan, Lewis & Bockius LLP

(57) ABSTRACT

Disclosed are a method of correcting a control logic of a selective catalytic reduction (SCR) catalyst and an exhaust system. The control logic may be adapted to calculate an injection amount of a reducing agent for the SCR catalyst at the least. The method may include detecting input variables including temperature of the SCR catalyst and exhaust flow rate, discretizing the input variables, standardizing the discretized input variables, determining whether the discretized input variables are within a correction range, and correcting the control logic of the SCR catalyst if the discretized input variables are within the correction range.

6 Claims, 4 Drawing Sheets

(52) U.S. Cl.
    CPC .... *F01N 2560/026* (2013.01); *F01N 2560/06* (2013.01); *F01N 2560/07* (2013.01); *F01N 2900/1402* (2013.01); *F01N 2900/1404* (2013.01); *F01N 2900/1602* (2013.01); *Y02T 10/24* (2013.01)

(58) Field of Classification Search
    CPC ..... F01N 2900/1404; F01N 2900/1602; F01N 2560/06; G05B 15/02; G05D 21/02; Y02T 10/24
    See application file for complete search history.

(56) References Cited

U.S. PATENT DOCUMENTS

| | | | |
|---|---|---|---|
| 8,201,394 B2 | 6/2012 | Chi et al. | |
| 2002/0099493 A1 | 7/2002 | Yasui et al. | |
| 2009/0288396 A1 | 11/2009 | Sakata et al. | |
| 2010/0028230 A1* | 2/2010 | Gady | F01N 3/208 423/239.1 |
| 2010/0275583 A1* | 11/2010 | Farrell | F01N 3/0205 60/285 |
| 2011/0058999 A1* | 3/2011 | Ettireddy | B01D 53/9418 423/213.5 |
| 2011/0265452 A1 | 11/2011 | Geveci et al. | |
| 2012/0058013 A1* | 3/2012 | Swanson | B01D 53/8625 422/109 |

* cited by examiner

METHOD OF CORRECTING CONTROL LOGIC OF SELECTIVE CATALYTIC REDUCTION CATALYST AND EXHAUST SYSTEM USING THE SAME

CROSS-REFERENCE TO RELATED APPLICATION

The present application claims priority of Korean Patent Application Number 10-2013-0161444 filed on Dec. 23, 2013, the entire contents of which application are incorporated herein for all purposes by this reference.

BACKGROUND OF INVENTION

Field of Invention

The present invention relates to a method of correcting a control logic of a selective catalytic reduction catalyst and an exhaust system using the same. More particularly, the present invention relates to a method of correcting a control logic of a selective catalytic reduction catalyst and an exhaust system using the same that prevents performance deterioration of the SCR catalyst due to frequent corrections.

Description of Related Art

Generally, exhaust gas flowing out from an engine through an exhaust manifold is urged into a catalytic converter mounted at an exhaust pipe and is purified therein. After that, the noise of the exhaust gas is decreased while passing through a muffler and the exhaust gas is then emitted into the air through a tail pipe. The catalytic converter purifies pollutants contained in the exhaust gas. In addition, a particulate filter for trapping particulate matter (PM) contained in the exhaust gas is mounted in the exhaust pipe.

A selective catalytic reduction (SCR) catalyst is one type of such a catalytic converter. Reducing agent such as urea, ammonia, carbon monoxide and hydrocarbon (HC) reacts better with nitrogen oxide than with oxygen in the SCR catalyst.

An exhaust system of a vehicle provided with the SCR catalyst includes an urea tank and dosing module. The dosing module injects reducing agent such as urea into the exhaust gas passing through the exhaust pipe, and thereby the SCR catalyst purifies the nitrogen oxide efficiently.

The reducing agent injected from the dosing module is adsorbed in the SCR catalyst, is released if the exhaust gas containing the nitrogen oxide passes through the SCR catalyst, and reacts with the nitrogen oxide. If excessive reducing agent is injected from the dosing module, a portion of the reducing agent is not adsorbed in the SCR catalyst and is slipped. Ammonia is typically used as the reducing agent of the SCR catalyst. If the ammonia is slipped from the SCR catalyst, the slipped ammonia may cause stink and customers may have complaints. If the dosing module injects the reducing agent insufficiently, the nitrogen oxide contained in the exhaust gas cannot be sufficiently removed and is exhausted to the exterior of the vehicle. Therefore, amount of the reducing agent injected from the dosing module should be precisely controlled.

In a conventional method of determining the amount of the reducing agent, the amount of the reducing agent according to driving conditions is stored in a map through experiments and the amount of the reducing agent according to current driving condition is determined from the map. However, since there are a large number of driving conditions affecting the amount of the reducing agent, manufacturing the map is a tedious and expensive process.

In addition, since the driving condition changes very quickly, a measuring apparatus has error, and experiments cannot be conducted under all the driving conditions when manufacturing the map, the map itself has error. In order to reduce the errors, the map is corrected. However, it is very difficult to get over innate limitations such as error of the measuring apparatus and quick change of the driving condition. Particularly, in a case that a vehicle runs on a road, a specific driving condition maintains for a very short time and an error calculated under the specific driving condition does not necessarily reflect actual characteristics of the SCR catalyst.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a method of correcting a control logic of a selective catalytic reduction (SCR) catalyst and an exhaust system using the same having advantages of discretizing and standardizing input variables in order to reflect transient characteristics of the SCR catalyst and performing correction only when the discretized and standardized input variables are within a correction region.

A method of correcting a control logic of a selective catalytic reduction catalyst according to various aspects of the present invention may correct a control logic for controlling operation of a selective catalytic reduction catalyst. The control logic may be adapted to calculate injection amount of reducing agent for the SCR catalyst at the least.

The method may include: detecting input variables including temperature of the SCR catalyst and exhaust flow rate; discretizing the input variables; standardizing the discretized input variables; determining whether the discretized input variables are within a correction range; and correcting the control logic of the SCR catalyst if the discretized input variables are within the correction range.

The correction of the control logic of the SCR catalyst may be performed when a time for which the discretized input variables are within the correction range is longer than or equal to a predetermined time.

The input variables may be discretized from equations $$f_{Temp} = \frac{T_{Cat} - T_0}{\Delta T_{Discret}} \text{ and } f_{dm_{EG}} = \frac{dm_{EG} - dm_0}{\Delta dm_{Discret}},$$

wherein $f_{Temp}$ is discretized temperature of the SCR catalyst, $T_{Cat}$ is the temperature of the SCR catalyst, $T_0$ is reference temperature, $\Delta T_{Discret}$ is unit temperature, $f_{dm_{EG}}$ is discretized exhaust flow rate, $dm_{EG}$ is the exhaust flow rate, $dm_0$ is reference exhaust flow rate, and $\Delta dm_{Discret}$ is unit exhaust flow rate.

The discretized input variables may be standardized by equations $$n_{Temp} = int(f_{Temp} + 0.5) \text{ and } n_{dm_{EG}} = int(f_{dm_{EG}} + 0.5),$$

wherein $n_{Temp}$ is standardized temperature of the SCR catalyst and $n_{dm_{EG}}$ is standardized exhaust flow rate.

The discretized input variables may be determined to be within the correction range if inequalities $abs\{f_{Temp} - n_{Temp}\} < \Delta T_{range}$ and $abs\{f_{dm_{EG}} - n_{dm_{EG}}\} < \Delta dm_{range}$ are satisfied, wherein $\Delta T_{range}$ is a predetermined temperature range and $\Delta dm_{range}$ is a predetermined exhaust flow rate range.

The method may further include interpolating the control logic of the SCR catalyst if the discretized input variables are not within the correction range.

The correction of the control logic of the SCR catalyst may be performed with respect to the standardized input variables.

An exhaust system according to various other aspects of the present invention may include: an engine adapted to generate exhaust gas while burning fuel and air; an intake pipe connected to and supplying the air to the engine; an exhaust pipe connected to the engine, the exhaust gas flowing through the exhaust pipe; an SCR catalyst mounted on the exhaust pipe and adapted to reduce nitrogen oxide contained in the exhaust gas using a reducing agent; a reducing agent supplier mounted on the exhaust pipe between the engine and the SCR catalyst and adapted to inject the reducing agent; an input variable detector adapted to detect input variables; and a controller including a control logic for calculating an injection amount of the reducing agent for the SCR catalyst at the least and adapted to control the reducing agent supplier according to the injection amount of the reducing agent, wherein the controller is adapted to discretize the input variables, to standardize the discretized input variables, and to correct the control logic if the discretized input variables are within a correction range.

The controller may correct the control logic when a time for which the discretized input variables are within the correction range is longer than or equal to a predetermined time.

The controller may discretize the input variables by equations $$f_{Temp} = \frac{T_{Cat} - T_0}{\Delta T_{Discret}} \text{ and } f_{dm_{EG}} = \frac{dm_{EG} - dm_0}{\Delta dm_{Discret}},$$

wherein $f_{Temp}$ is discretized temperature of the SCR catalyst, $T_{Cat}$ is the temperature of the SCR catalyst, $T_0$ is reference temperature, $\Delta T_{Discret}$ is unit temperature, $f_{dm_{EG}}$ din is discretized exhaust flow rate, $dm_{EG}$ is the exhaust flow rate, $dm_0$ is reference exhaust flow rate, and $\Delta dm_{Discret}$ is unit exhaust flow rate.

The controller may standardize the discretized input variables by equations $n_{Temp} = int(f_{Temp} + 0.5)$ and $n_{dm_{EG}} = int(f_{dm_{EG}} + 0.5)$, wherein $n_{Temp}$ is standardized temperature of the SCR catalyst and $n_{dm_{EG}}$ is standardized exhaust flow rate.

The controller may determine that the discretized input variables are within the correction range if inequalities $abs\{f_{Temp} - n_{Temp}\} < \Delta T_{range}$ and $abs\{f_{dm_{EG}} - n_{dm_{EG}}\} < \Delta dm_{range}$ are satisfied, wherein $\Delta T_{range}$ is a predetermined temperature range and $\Delta dm_{range}$ is a predetermined exhaust flow rate range.

The controller may be adapted to interpolate the control logic if the discretized input variables are not within the correction range.

The controller may be adapted to correct the control logic with respect to the standardized input variables.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
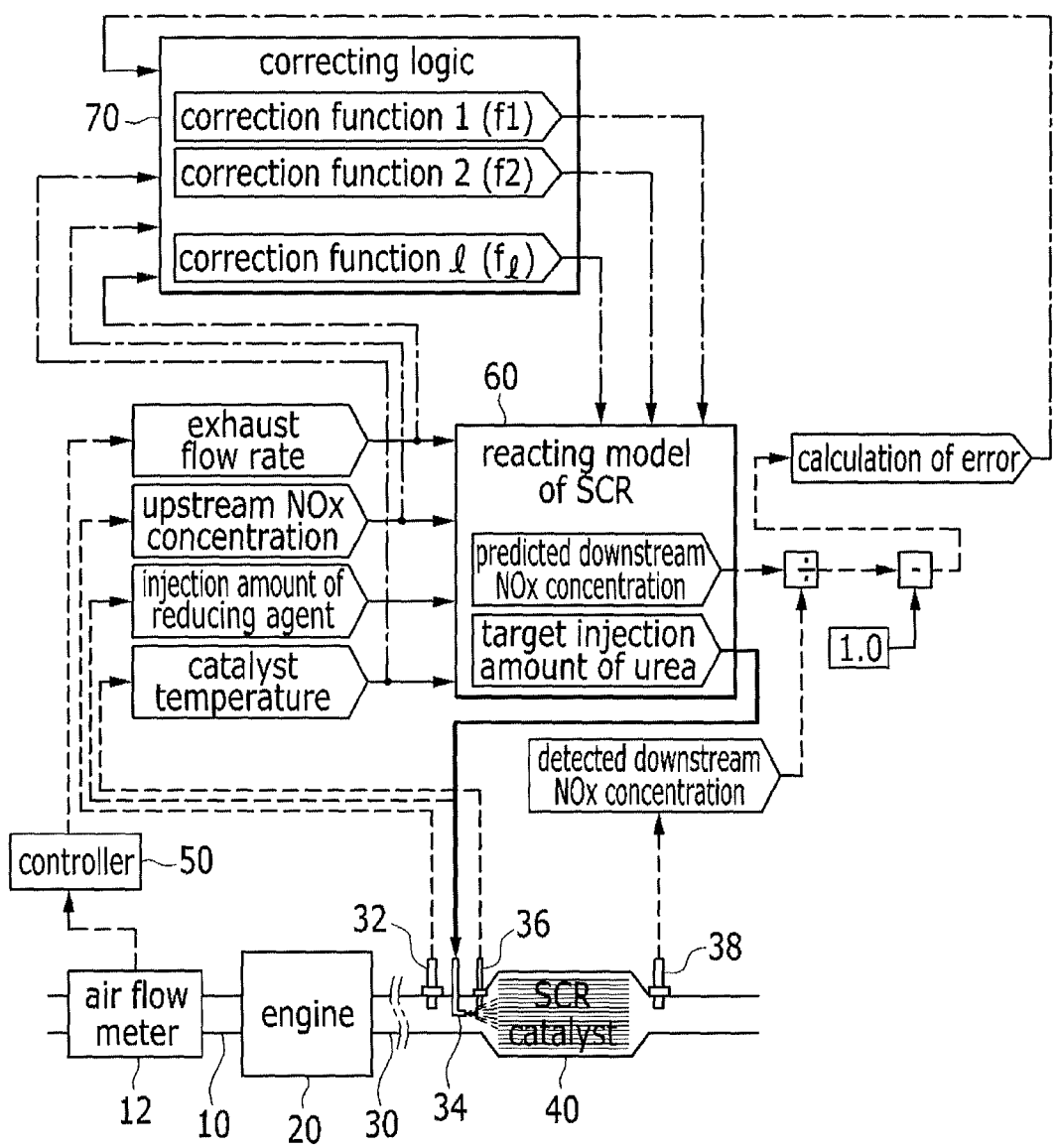
FIG. 1 is a schematic diagram of an exemplary exhaust system according to the present invention.

FIG. 1 is a schematic diagram of an exhaust system according to various embodiments of the present invention. As shown in FIG. 1, nitrogen oxide in exhaust gas is removed while the exhaust gas generated in an engine 20 passes through a selective catalytic reduction (SCR) catalyst 40. If necessary, a particulate filter for trapping particulate matter contained in the exhaust gas and/or an oxidation catalyst for oxidizing carbon monoxide or hydrocarbon contained in the exhaust gas may be used. The exhaust system illustrated in FIG. 1 shows a simplified layout of an exhaust system to which spirit of the present invention can be applied, and it is to be understood that a range of the present invention is not limited to the exhaust system illustrated in FIG. 1.

The engine 20 burns air/fuel mixture in which fuel and air are mixed so as to convert chemical energy into mechanical energy. The engine 20 is connected to an intake manifold so as to receive the air in a combustion chamber, and is connected to an exhaust manifold such that the exhaust gas generated in combustion process is gathered in the exhaust manifold and is exhausted to the exterior. An injector is mounted in the combustion chamber so as to inject the fuel into the combustion chamber.

An intake pipe 10 is connected to the intake manifold of the engine 20 and is adapted to supply the air to the engine 20. An air flow meter 12 is mounted on the intake pipe 10 and detects flow rate of the air passing through the intake pipe 10.

An exhaust pipe 30 is connected to the exhaust manifold and is adapted to discharge the exhaust gas to the exterior of a vehicle.

The SCR catalyst 40 is mounted on the exhaust pipe 30 and is adapted to reduce the nitrogen oxide contained in the exhaust gas into nitrogen gas using reducing agent.

For these purposes, the exhaust system further includes a urea tank, a urea pump and a dosing module 34. For brief description, the urea tank and the urea pump are not illustrated in the drawings. In addition, urea is injected by the dosing module 34 in this specification but it is not limited that the dosing module 34 just injects the urea. That is, the dosing module 34 may inject ammonia. Furthermore, reducing agent other than the ammonia can be injected together with the ammonia or by itself.

The dosing module 34 injects the urea pumped by the urea pump into the exhaust pipe 30. The dosing module 34 is mounted on the exhaust pipe 30 between the engine 20 and the SCR catalyst 40 and injects the urea into the exhaust gas before entering the SCR catalyst 40. The urea injected into the exhaust gas is decomposed into the ammonia and the decomposed ammonia is used as the reducing agent for the nitrogen oxide. It is to be understood in this specification and claims that the reducing agent injected by the dosing module 34 includes materials that will be the reducing agent.

Meanwhile, the urea tank, the urea pump and the dosing module described in this specification are examples of reducing agent supplying devices, and it is to be understood that a range of the present invention is not limited to the examples of the reducing agent supplying devices. That is, other types of the reducing agent supplying devices can be used in the present invention.

The exhaust system further includes a plurality of sensors including a first NOx sensor 32, a temperature sensor 36 and/or second NOx sensor 38.

The first NOx sensor 32 is mounted on the exhaust pipe 30 upstream of the SCR catalyst 40 and detects NOx concentration contained in the exhaust gas at an upstream of the SCR catalyst. In various exemplary embodiments, the NOx concentration at the upstream of the SCR catalyst 40 may be predicted based on exhaust flow rate, operation history of the engine, temperature of the SCR catalyst 40, injection amount of the reducing agent and/or amount of the reducing agent absorbed in the SCR catalyst 40, instead of using the first NOx sensor 32.

The temperature sensor 36 is mounted on the exhaust pipe 30 upstream of the SCR catalyst 40 or in the SCR catalyst 40, and detects the temperature of the exhaust gas at the upstream of the SCR catalyst 40 or in the SCR catalyst 40. For better comprehension and ease of description, the temperature of the SCR catalyst 40 described in this specification and claim may be temperature of the exhaust gas at the upstream of the SCR catalyst 40 or temperature of the exhaust gas in the SCR catalyst 40.

The second NOx sensor 38 is mounted on the exhaust pipe 30 downstream of the SCR catalyst 40 and detects the NOx concentration contained in the exhaust gas at a downstream of the SCR catalyst 40.

The exhaust system further includes a controller 50. The controller 50 controls operation of the injector and the dosing module 34 based on the detection of the first and second NOx sensors 32 and 38 and the temperature sensor 36.

The controller 50 may calculate exhaust flow rate based on flow rate of the air passing through the intake pipe 10.

The controller 50 further includes a reacting model 60 of the SCR catalyst 40 for predicting reaction of the SCR catalyst 40. The reacting model 60 is defined by m parameters. Herein, m is a natural number. For example, the parameters may includes parameter related to speed of purifying the NOx, parameters related to speed of oxidizing the ammonia, parameters related absorbed amount of the ammonia, and so on. In addition, the reacting model 60 is adapted to predict the NOx concentration contained in the exhaust gas at the downstream of the SCR catalyst 40 and calculate target injection amount of the reducing agent (i.e., target injection amount of the urea) at the least. An error may be calculated by comparing the predicted NOx concentration with the NOx concentration detected by the second NOx sensor 38. In addition, the reacting model 60 has n input variables. Herein, n is a natural number that is smaller than m. The input variables may include, but not limited to, the exhaust flow rate, the NOx concentration contained in the exhaust gas at the upstream of the SCR catalyst 40, the injection amount of the reducing agent and the temperature of the SCR catalyst 40.

It is exemplified in this specification that the reaction model 60 is used as a control logic for controlling operation of the SCR catalyst 40. The control logic may be any one of various control logics such as a control logic which calculates the injection amount of the reducing agent by using a map and a control logic which calculates the injection amount of the reducing agent by using specific variables. That is, since the spirit of the present invention can be applied to all the control logics for controlling operation of the SCR catalyst 40, it is to be understood that all the control logics for controlling operation of the SCR catalyst 40 is included within the scope of the present invention.

The controller 50 further includes a correcting logic 70 for correcting the parameters using the error. The correcting logic 70 may include at least one correction function f1, f2, . . . , and fl. The correcting logic 70 is adapted to calculate a correction coefficient using the input variables and the error. The controller 50 corrects the parameters according to the correction coefficient.

Figure 2:
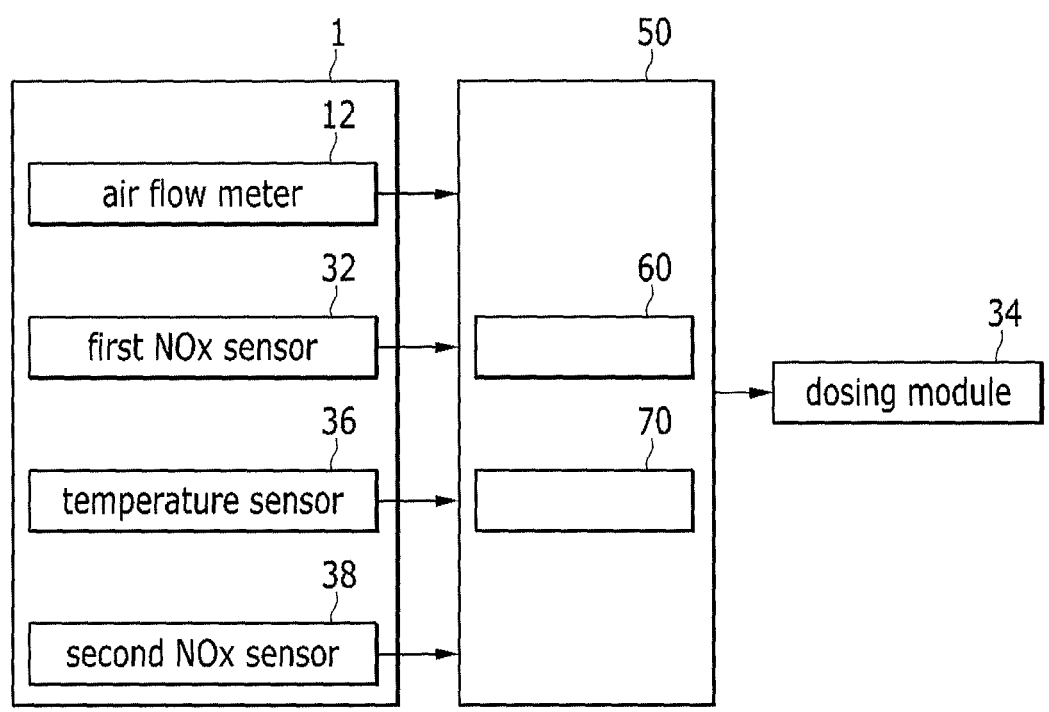
FIG. 2 is a block diagram illustrating a relationship of an input and output of a controller of an exemplary exhaust system according to the present invention.

FIG. 2 is a block diagram illustrating a relationship of an input and output of a controller of an exhaust system according to various embodiments of the present invention. As shown in FIG. 2, the input variables detected by an input variable detector 1 is transmitted to the controller 50, and the controller 50 controls the dosing module 34 based on the input variables. The input variable detector 1 includes the air flow meter 12, the first NOx sensor 32, the temperature sensor 36 and/or the second NOx sensor 38.

The air flow meter 12 detects the flow rate of the air passing through the intake pipe 10 and transmits a signal corresponding thereto to the controller 50. The controller 50 may calculate the exhaust flow rate based on the flow rate of the air.

The first NOx sensor 32 detects the NOx concentration contained in the exhaust gas at the upstream of the SCR catalyst 40 and transmits a signal corresponding thereto to the controller 50.

The temperature sensor 36 detects the temperature of the SCR catalyst 40 and transmits a signal corresponding thereto to the controller 50.

The second NOx sensor 38 detects the NOx concentration contained in the exhaust gas at the downstream of the SCR catalyst 40 and transmits a signal corresponding thereto to the controller 50.

The controller 50 calculates the target injection amount of the reducing agent by substituting the exhaust flow rate, the NOx concentration contained in the exhaust gas at the upstream of the SCR catalyst 40, the injection amount of the reducing agent and the temperature of the SCR catalyst 40 into the reacting model 60, and controls the dosing module 34 according to the target injection amount of the reducing agent.

The controller 50 predicts the NOx concentration contained in the exhaust gas at the downstream of the SCR catalyst 40 by substituting the exhaust flow rate, the NOx concentration contained in the exhaust gas at the upstream of the SCR catalyst 40, the injection amount of the reducing agent and the temperature of the SCR catalyst 40 into the reacting model 60. In addition, the controller 50 calculates the error between the predicted NOx concentration and the NOx concentration detected by the second NOx sensor 38.

Furthermore, the controller 50 calculates the correction coefficient for correcting the parameters by substituting the error, the exhaust flow rate, the NOx concentration contained in the exhaust gas at the upstream of the SCR catalyst 40 and the temperature of the SCR catalyst 40 into the correcting logic 70, and corrects the parameters according to the correction coefficient.

The controller 50 can be realized by one or more processors activated by a predetermined program, and the predetermined program can be programmed to perform each step of a method of correcting a control logic of a selective catalytic reduction catalyst according to an exemplary embodiment of the present invention.

Meanwhile, the controller 50 may include a memory. The reacting model 60 and the correcting logic 70 may be stored in the memory. In addition, the memory may be a non-volatile memory.

Figure 3:
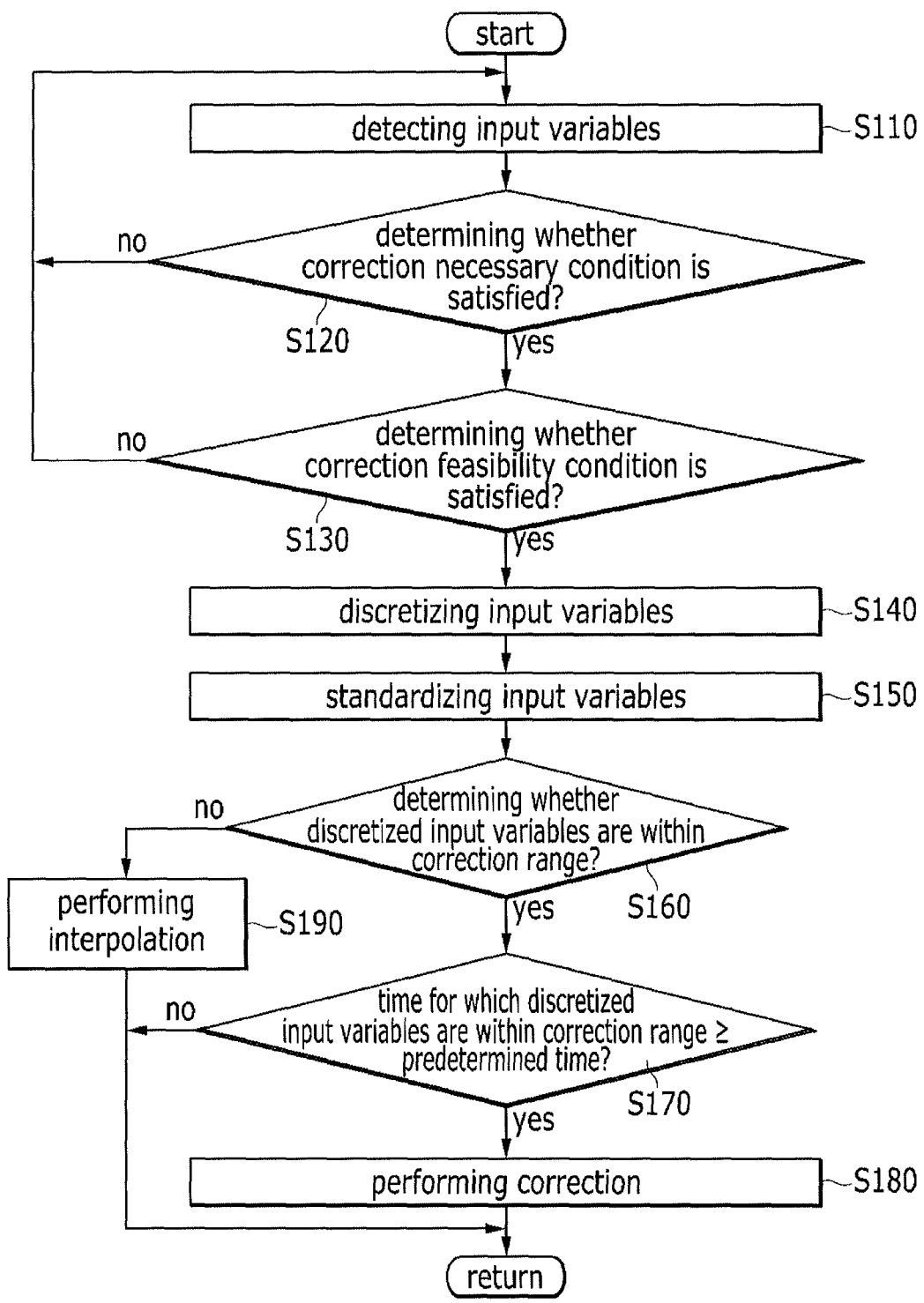
FIG. 3 is a flowchart of an exemplary method of correcting a control logic of a selective catalytic reduction catalyst according to an the present invention.

FIG. 3 is a flowchart of a method of correcting a control logic of a selective catalytic reduction catalyst according to various embodiments of the present invention. As shown in FIG. 3, a method of correcting a control logic of a selective catalytic reduction catalyst begins with detecting the input variables at step S110. The input variables may include the exhaust flow rate, the NOx concentration contained in the exhaust gas at the upstream of the SCR catalyst 40, the injection amount of the reducing agent and/or the temperature of the SCR catalyst 40.

If the input variables are detected, the controller 50 determines whether a correction necessary condition is satisfied at step S120. The correction necessary condition is satisfied if the error between the predicted NOx concentration and the NOx concentration detected by the second NOx sensor 38 is greater than a predetermined value under current input variables. The predetermined value may be a preset suitable value.

If the correction necessary condition is not satisfied at the step S120, the method returns to the step S110.

If the correction necessary condition is satisfied at the step S120, the controller 50 determines whether a correction feasibility condition is satisfied at step S130. The correction feasibility condition is satisfied if current temperature of the SCR catalyst 40 exists within a predetermined temperature range and current exhaust flow rate exists within a predetermined range of the exhaust flow rate. For example, if the temperature of the SCR catalyst 40 is too low or the exhaust flow rate is too small, the NOx concentration predicted by the reacting model 60 may be meaningless. If the parameters are corrected based on the meaningless value, reliability of correction may be low and unnecessary correction may be iterated. Therefore, the correction is performed only when the reaction of the SCR catalyst 40 predicted through the reacting model 60 can indicate the reaction occurring actually in the SCR catalyst 40.

If the correction feasibility condition is not satisfied at the step S130, the method returns to the step S110.

If the correction feasibility condition is satisfied at the step S130, the controller 50 discretizes the input variables at step S140. The input variables can be discretized by equations $$f_{Temp} = \frac{T_{Cat} - T_0}{\Delta T_{Discret}} \text{ and } f_{dm_{EG}} = \frac{dm_{EG} - dm_0}{\Delta dm_{Discret}}.$$

Figure 4:
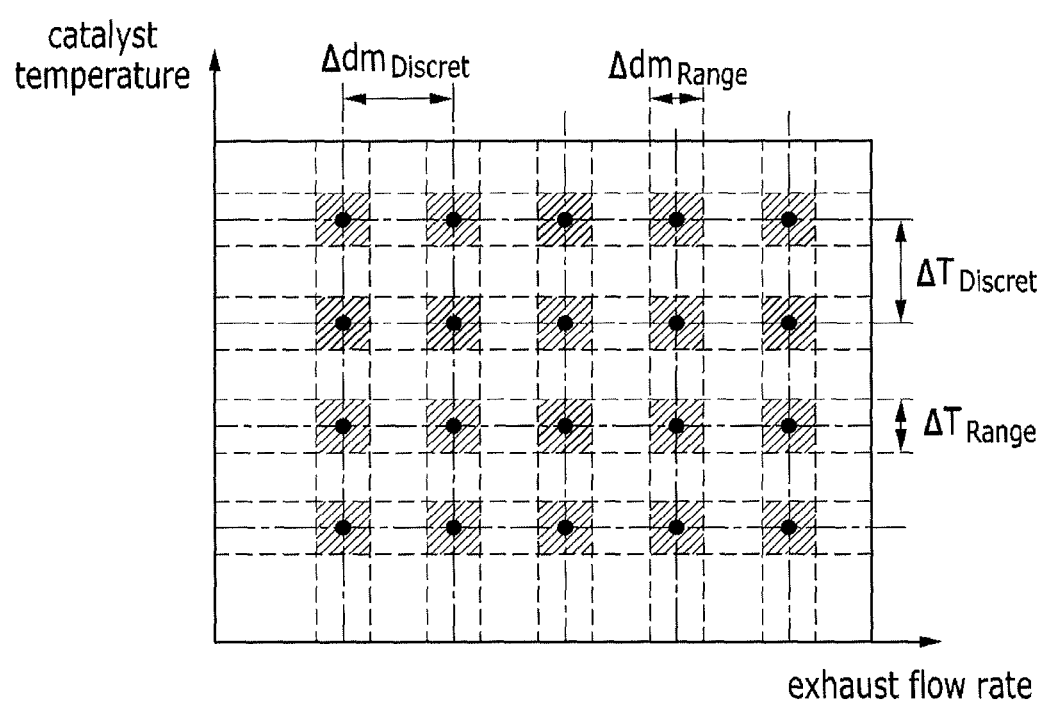
FIG. 4 is a graph for explaining discretization and standardization of input variables.

Herein, $f_{Temp}$ is discretized temperature of the SCR catalyst 40, $T_{Cat}$ is the temperature of the SCR catalyst 40, $T_0$ is reference temperature, $\Delta T_{Discret}$ is unit temperature, $f_{dm_{EG}}$ is discretized exhaust flow rate, $dm_{EG}$ is the exhaust flow rate, $dm_0$ is reference exhaust flow rate, and $\Delta dm_{Discret}$ is unit exhaust flow rate. That is, the controller 50, as shown in FIG. 4, divides the input variables (i.e., driving conditions) into a plurality of regions. The reference temperature and the reference exhaust flow rate may respectively be minimum values of the temperature of the SCR catalyst 40 and the exhaust flow rate at a region where the control logic can be corrected, but are not limited thereto. In addition, the unit temperature and the unit exhaust flow rate may be arbitrarily determined. The smaller the unit temperature and the unit exhaust flow rate are, the more precise the correction is. However, if the unit temperature and the unit exhaust flow rate are too small, the correction may be inaccurate. Therefore, in determining the unit temperature and the unit exhaust flow rate, precision of the correction should be considered.

It is exemplified in this specification but is not limited that the temperature of the SCR catalyst 40 and the exhaust flow rate among the input variables are discretized. That is, all the input variables may be discretized.

If the input variables are discretized at the step S140, the controller 50 standardizes the discretized input variables at step S150. That is, the controller 140 calculates representative values that represent the plurality of regions. The discretized input variables may be standardized by equations $$n_{Temp} = int(f_{Temp} + 0.5) \text{ and } n_{dm_{EG}} = int(f_{dm_{EG}} + 0.5),$$

Herein, $n_{Temp}$ is standardized temperature of the SCR catalyst and $n_{dm_{EG}}$ is standardized exhaust flow rate. In addition, "int" function outputs a maximum integer that is smaller than a value in a parenthesis, and 0.5 is required to round off the discretized input variables.

If the input variables are standardized at the step S150, the controller 50 determines whether the discretized input variables are within a correction range at step S160. The discretized input variables are determined to be within the correction range if inequalities $abs\{f_{Temp} - n_{Temp}\} < \Delta T_{range}$ and $abs\{f_{dm_{EG}} - n_{dm_{EG}}\} < \Delta dm_{range}$ are satisfied. Herein, $\Delta T_{range}$ is predetermined temperature range and $\Delta dm_{range}$ is predetermined exhaust flow rate range. That is, the discretized input variables are determined to be within the correction range if a difference between the discretized input variables and the standardized input variables is within predetermined input variable range. The predetermined temperature range and the predetermined exhaust flow rate range may be determined freely by a person of an ordinary skill in the art. The smaller the predetermined temperature range and the predetermined exhaust flow rate range are, the more precise the correction is. However, if the predetermined temperature range and the predetermined exhaust flow rate range are too small, the correction may be inaccurate. Therefore, in determining the predetermined temperature range and the predetermined exhaust flow rate range, precision of the correction should be considered.

If the discretized input variables are within the correction range at the step S160, the controller 50 determines whether a time for which the discretized input variables are within the correction range is longer than or equal to a predetermined time at step S170.

If the time for which the discretized input variables are within the correction range is shorter than the predetermined time at the step S170, the method returns to the step S110. That is, since the controller 50 cannot correct precisely if the time for which the discretized input variables are within the correction range is short, the controller 50 does not correct the control logic. Therefore, inaccurate or frequent correction may be prevented.

If the time for which the discretized input variables are within the correction range is longer than or equal to the predetermined time at the step S170, the controller 50 corrects the control logic. At this time, the control logic is corrected with respect to the standardized input variables. That is, although positions of the discretized input variables change in the correction range, the discretized input variables is assumed not to change and to maintain the standardized input variables. If the control logic is the reaction model 60, the parameters defining the reaction model 60 are corrected by substituting the standardized input variables into the correcting logic 70. If the control logic includes a map, the output value corresponding to the standardized input variables is corrected.

Meanwhile, if the discretized input variables are not within the correction range at the step S160, the controller 50 interpolates the control logic at step S190. The interpolation of the control logic is performed based on compensation values of the standardized input variables enclosing the discretized input variables. On the contrary, the control logic may be interpolated to an average value of the compensation values of the standardized input variables enclosing the discretized input variable. In addition, the control logic may be interpolated only when the time for which the discretized input variables are within the predetermined region is longer than or equal to the predetermined time.

If the correction is completed at the step S180 or the interpolation is completed at the step S190, the method returns to the step S110.

As described above, waste of the memory and performance deterioration of the selective catalytic reduction catalyst due to frequent corrections may be prevented according to various embodiments of the present invention. In addition, robustness of the control logic may be secured by correcting the control logic considering transient characteristics of the selective catalytic reduction catalyst.

For convenience in explanation and accurate definition in the appended claims, the terms "upsteam" or "downstream", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of correcting a control logic of a selective catalytic reduction (SCR) catalyst, wherein the control logic is adapted to calculate an injection amount of a reducing agent for the SCR catalyst at the least, the method comprising:
   detecting, by a controller, input variables including temperature of the SCR catalyst and exhaust flow rate;
   discretizing, by the controller, the input variables;
   standardizing, by the controller, the discretized input variables;
   determining, by the controller, whether the discretized input variables are within a correction range; and
   correcting, by the controller, the control logic of the SCR catalyst in response to determine that the discretized input variables are within the correction range,
   wherein the input variables are discretized from equations $$f_{Temp} = \frac{T_{Cat} - T_0}{\Delta T_{Discret}} \text{ and } f_{dm_{EG}} = \frac{dm_{EG} - dm_0}{\Delta dm_{Discret}},$$

wherein $f_{Temp}$ is discretized temperature of the SCR catalyst, $T_{Cat}$ is the temperature of the SCR catalyst, $T_0$ is reference temperature, $\Delta T_{Discret}$ is unit temperature, $f_{dm_{EG}}$ is discretized exhaust flow rate, $dm_{EG}$ is the exhaust flow rate, $dm_0$ is reference exhaust flow rate, and $\Delta dm_{Discret}$ is unit exhaust flow rate.

2. The method of claim 1, wherein the correction of the control logic of the SCR catalyst is performed in response to determine that a time for which the discretized input variables are within the correction range is longer than or equal to a predetermined time.

3. The method of claim 1, wherein the discretized input variables are standardized by equations $$n_{Temp} = int(f_{Temp} + 0.5) \text{ and } n_{dm_{EG}} = int(f_{dm_{EG}} + 0.5),$$

wherein $n_{Temp}$ is standardized temperature of the SCR catalyst and $n_{dm_{EG}}$ is standardized exhaust flow rate.

4. The method of claim 3, wherein the discretized input variables are determined to be within the correction range when inequalities $abs\{f_{Temp} - n_{Temp}\} < \Delta T_{range}$ and $abs\{f_{dm_{EG}} - n_{dm_{EG}}\} < \Delta dm_{range}$ are satisfied,
   wherein $\Delta T_{range}$ is a predetermined temperature range and $\Delta dm_{range}$ is a predetermined exhaust flow rate range.

5. The method of claim 1, further comprising:
   interpolating, by the controller, the control logic of the SCR catalyst, in response to determine that the discretized input variables are not within the correction range.

6. The method of claim 1, wherein the correction of the control logic of the SCR catalyst is performed with respect to the standardized input variables.

* * * * *